United States Patent
Nishibori et al.

(10) Patent No.: US 6,470,810 B1
(45) Date of Patent: Oct. 29, 2002

(54) RESIN PALLET HAVING A SPRING STRUCTURE AND METHOD OF PRODUCING THE RESIN PALLET

(75) Inventors: Sadao Nishibori, Tokyo; Yuichiro Nakamura, Gifu, both of (JP)

(73) Assignee: Ein Kohsan Co., Ltd., Tokyo (JP)

( * ) Notice: Subject to any disclaimer, the term of this patent is extended or adjusted under 35 U.S.C. 154(b) by 0 days.

(21) Appl. No.: 09/821,308

(22) Filed: Mar. 29, 2001

(51) Int. Cl.[7] .................................................. B65D 19/38
(52) U.S. Cl. .................................. 108/57.28; 108/57.25
(58) Field of Search ........................... 108/57.28, 57.25, 108/901, 902, 57.26, 57.27, 57.34

(56) References Cited

U.S. PATENT DOCUMENTS

| | | | |
|---|---|---|---|
| 3,511,191 A | * | 5/1970 | Barry, Jr. et al. |
| 3,581,681 A | * | 6/1971 | Newton |
| 3,814,778 A | * | 6/1974 | Hosoda et al. |
| 3,880,092 A | * | 4/1975 | Seeber et al. |
| 3,915,098 A | * | 10/1975 | Nania |
| 4,103,857 A | * | 8/1978 | Levenhagen |
| 4,230,049 A | * | 10/1980 | Horne |
| 4,303,019 A | * | 12/1981 | Haataja et al. |
| 4,397,246 A | * | 8/1983 | Ishida et al. |
| 4,467,728 A | * | 8/1984 | Horne |
| 5,080,960 A | * | 1/1992 | Smorada |
| 5,687,652 A | * | 11/1997 | Ruma |

FOREIGN PATENT DOCUMENTS

| | | |
|---|---|---|
| FR | 1 596 011 A | 7/1970 |
| FR | 2 180 516 A | 11/1973 |
| FR | 2 346 135 A | 10/1977 |

* cited by examiner

Primary Examiner—Jose V. Chen
(74) Attorney, Agent, or Firm—Dennis G. LaPointe; Mason & Associates, P.A.

(57) ABSTRACT

A resin pallet having enhanced shock absorbing capability, load capacity and durability comprises a pallet of a three-dimensional structure with a predetermined bulk density and voids, the three dimensional structure being formed by contacting, entwining, and gathering adjacent ones of random loops or curls of continuous filaments and/or short filaments of a thermoplastic resin. A single unit of the pallet is formed with high density portions having an increased bulk density at opposite ends of fork insertion holes of the single unit of the pallet in a direction of length of the fork insertion holes and approximately at a central portion of the single unit of the pallet in the direction, the high density portions extending to the opposite ends of the fork insertion holes in the direction of length of the fork insertion holes and opposite ends of the fork insertion holes in a direction of width thereof, and formed with flat portions having a bulk density not higher than those of the high density portions at least inner surfaces of the fork insertion holes or an outer periphery and the inner surfaces of the fork insertion holes being formed.

16 Claims, 6 Drawing Sheets

RESIN PALLET HAVING A SPRING STRUCTURE AND METHOD OF PRODUCING THE RESIN PALLET

BACKGROUND OF THE INVENTION

1. Field of the Invention

The present invention relates to a resin pallet with a spring structure and a method of producing the same, and more particularly to an inexpensive cushioning resin pallet with a spring structure, which is excellent in shock resistance, load capacity and durability, prolonged in service life, lightweight, and at the same time can be easily manufactured, and a method of producing the same.

2. Description of the Related Art

In general, wooden pallets are widely and frequently used for transshipping or conveying articles by forklift since they are lightweight, have surfaces with a friction coefficient large enough to make it difficult for the articles to slip thereon, and are capable of immediately absorbing water attached to surfaces thereof to thereby prevent the articles from being wet by the water. A wooden pallet of this kind has a body which is formed by arranging a plurality of upper and lower square wooden blocks in parallel with each other at predetermined space intervals, and connecting them by wooden plates with nails and screws. Hollow spaces defined by the square blocks and the wooden plates are used as fork insertion holes for inserting a fork of a forklift.

Although the wooden pallets most generally used today are advantageous in that they can be manufactured at low costs and have certain strengths, they are disadvantageous in that they are heavy in weight, and readily absorb water so that they are easily corroded, resulting in short service life. Further, they tend to be quickly soiled, which makes it difficult to employ them in food and medical industries. Still further, when they are stored in open yards, lower end portions thereof, which absorb and hence contain a lot of rain water, are decayed quickly.

On the other hand, plastic pallets have a complicated rib structure for reduction of weight thereof. A plastic pallet is manufactured by injection-molding a top portion and a bottom portion of the pallet as separate pieces, and then fusion-bonding these portions. Although plastic pallets have longer service lives and are hard to be soiled, manufacturing costs thereof are much higher than those of wooden pallets, and they are low in durability and shock resistance.

More specifically, conventional plastic pallets are configured to have rib structures so as to impart strength thereto since they are made of plastic which is higher in specific gravity than wood. The rib portions of the pallets are thin, so that stress concentration can occur thereat. Therefore, although they exhibit longer service lives than wooden pallets, they can be deformed and cracked while they are used for a long time.

Further, pallets made of steel exhibit very high strengths but they are heavy in weight and corroded with rust.

The present invention has been made as a solution to the above problems, and an object thereof is to provide a resin pallet having a spring structure which prevents occurrence of stress concentration and permitting a long-term usage. Further, since the conventional resin pallets have complicated shapes, it is required to mold portions thereof by injection, injection compression, or extrusion compression. Moreover, it is necessary to mold the respective portions by using corresponding molding dies as well as carry out thermal fusion bonding and assembling operations. Therefore, another object of the present invention is to provide a resin pallet which can be molded with ease by a single molding apparatus and a single molding die, and have desired properties, particularly an excellent shock resistance and load capacity. Further, still another object of the present invention is to provide a resin pallet which has desired physical properties in shock resistance and load capacity, and at the same time includes a rib structure.

SUMMARY OF THE INVENTION

A resin pallet having a spring construction, according to the present invention, is a pallet of a three-dimensional structure with a predetermined bulk density and voids, the three dimensional structure being formed by contacting, entwining, and gathering adjacent ones of random loops or curls of continuous filaments and/or short filaments of a thermoplastic resin (hereinafter referred to as "the three-dimensional structure"), characterized in that a single unit of the pallet is formed with high density portions having an increased bulk density at opposite ends of fork insertion holes of the single unit in a direction of length of the fork insertion holes and approximately at a central portion of the single unit in the direction, the high density portions extending to the opposite ends of the fork insertion holes in the direction of length of the fork insertion holes and opposite ends of the fork insertion holes in a direction of width thereof, and formed with flat portions having a bulk density not higher than those of the high density portions at least inner surfaces of the fork insertion holes or an outer periphery and the inner surfaces of the fork insertion holes being formed.

The present invention is also characterized in that, for instance, the continuous filaments and/or the short filaments are formed of a thermoplastic elastomer, that the continuous filaments and/or the short filaments have a diameter of 0.1 mm to 3.0 mm, preferably, 0.3 mm to 0.7 mm, or that a structure of the three-dimensional structure has a bulk density of 0.1 g/cm$^3$ to 0.9 g/cm$^3$. Further, an outer peripheral surface of the pallet including the inner surfaces of the fork insertion holes or the outer periphery of the fork insertion holes may be formed with flat portions having a bulk density not higher than that of the high density portions, or portions other than the high density portions and the flat portions may be formed as low density portions having a bulk density not higher than that of the flat portions.

If the continuous filaments and/or the short filaments forming the low density portions have a diameter of 0.1 mm to 3.0 mm, preferably 0.7 mm to 1.5 mm, the structure of the three-dimensional structure having a bulk density of 0.01 g/cm$^3$ to 0.1 g/cm$^3$, preferably 0.02 g/cm$^3$ to 0.05 g/cm$^3$, the weight of the pallet can be further reduced.

Further, when portions except the flat portions are formed with high density portions, by arranging two kinds of groups of injection ports for high density portions and low density portions, the molding of the pallet is made easier.

Further, the method according to the present invention is a method of producing a resin pallet by melt-extruding a thermoplastic resin and/or a thermoplastic elastomer into a plurality of filaments, and contacting, entwining and gathering adjacent ones of random loops or curls of continuous filaments, thereby forming the filaments into a pallet having a three-dimensional structure with a predetermined bulk density and voids, characterized by comprising the steps of forming high density portions and flat portions, or the high density portions and the flat portions as well as low density portions in a direction of width of the fork insertion holes by changing a take-off speed for taking off the fusion-extruded continuous filaments; extrusion-molding the fork insertion holes by using cores; and extruding, taking off, and forming high density portions and flat portions, or the high density portions and the flat portions as well as low density portions in a direction of length of the fork insertion holes, by changing a density of injection ports, on a portion-by-portion basis.

When the fusion-extruded material is taken off, in the direction of length of the fork insertion holes, the take-off speed is made faster in a manner corresponding to the length of the single unit than when the low density portions in the direction of length of the fork insertion holes are formed, and cutting the fusion-extruded material in a direction of width of the fork insertion holes to the length of each the single unit of the pallet. By this step, it is possible to continuously produce units of the resin pallet according to the present invention.

BRIEF DESCRIPTION OF THE DRAWINGS

The objects and advantages of the invention will become understood from the following detailed description of preferred embodiments thereof in connection with the accompanying drawings in which like numerals designate like elements, and in which:

FIGS. 1A to 1E are diagrams schematically showing an embodiment (first embodiment) of the present invention, in which:

FIGS. 4A to 4C are diagrams schematically showing a molding die according to the present invention, in which;

FIGS. 5A to 5F are diagrams schematically showing another embodiment (second embodiment) of the present invention, in which:

FIGS. 6A to 6E are diagrams schematically showing still another embodiment (third embodiment) of the present invention, in which:

DETAILED DESCRIPTION OF THE PREFERRED EMBODIMENT

Three-dimensional Structure

A three-dimensional structure employed in the present invention has voids and is formed of continuous filaments and/or e.g. short filaments, which are randomly entwined and gathered. The continuous and/or short filaments form a plurality of loops or curls. The three-dimensional structure described above is formed into a single unit of the pallet 30 as follows. A thermoplastic elastomer, for instance, is subjected to melt extrusion at a predetermined speed through a plurality of injection ports, taken off by a winder 13, referred to hereinafter, and formed into solid or hollow continuous filaments of 60 deniers to 57,000 deniers, preferably 570 deniers to 14,300 deniers. The filaments in a fused state are caused to form loops having a diameter of 1 mm to 10 mm, preferably 1 mm to 5 mm, and are taken off by the winder 13 within water while bringing adjacent ones of the filaments into contact with each other within the water to be entwined forming random loops, whereby a single unit of the pallet 30 is formed.

The contacted and entwined portions of the filaments are at least partially fused and bonded to one another. By adjusting the take-off speed of the winder 13 according to intervals of a single unit of the pallet 30 as defined in JIS, high density portions H (33 to 35) which form lateral block portions 33 to 35 extending in a lateral direction orthogonal to the direction of the length of fork insertion holes 23, or low density portions L surrounding the high density portions H and the fork insertion holes 23, are formed as illustrated in FIG. 1 showing the first embodiment.

Single pallet: 900 mm (width)×900 mm (length)×115 mm (thickness); 10 Kg (weight)

Fork insertion hole: 250 mm (width)×900 mm (length)×60 mm (thickness)

As described above, each of the block portions extending in the direction orthogonal to the direction of the length of the fork insertion holes 23 can be manufactured by forming a three-dimensional spring structure which includes high bulk density portions H formed when the take-off speed is low, that is, the high density portions, and low density portions L other than the high density portions, which are formed when the take-off speed is high, and has a predetermined thickness. Further, the fork insertion holes 23 are molded by carrying out extrusion using cores 17, to be described later, in the form of respective male molds arranged within a molding die 12 in a manner corresponding to the fork insertion holes such that the male molds protrude in a direction of extrusion of the resin material. Vertical block portions 42 to 44 which form high density portions H in the direction of the length of the fork insertion holes 23, and flat portions M forming top and bottom deck boards 52, 53, side deck boards 56 and 57, and four inner surfaces 54 and 55 of the fork insertion holes 23 and 23, and the low density portions L forming essential part of each single unit of the pallet 30 other than the high density portions H and the flat portions M, are each extruded and taken off while changing the arrangement or density of injection ports 18 formed through the molding die 12.

Figure 1A:
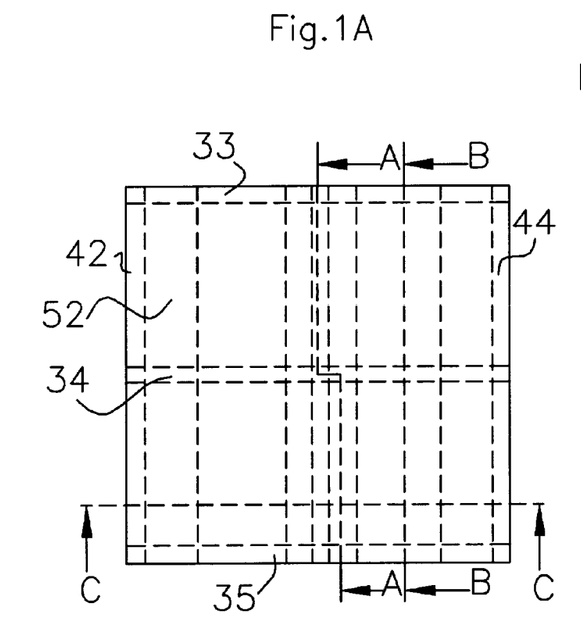
FIG. 1A is a plan view of the first embodiment.
Figure 1B:
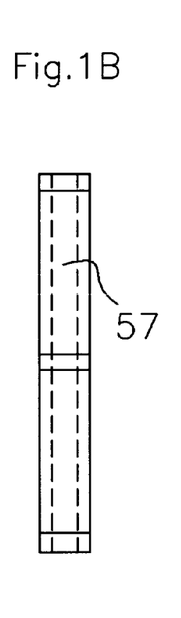
FIG. 1B is a side view of the first embodiment.
Figures 1C, 1D:
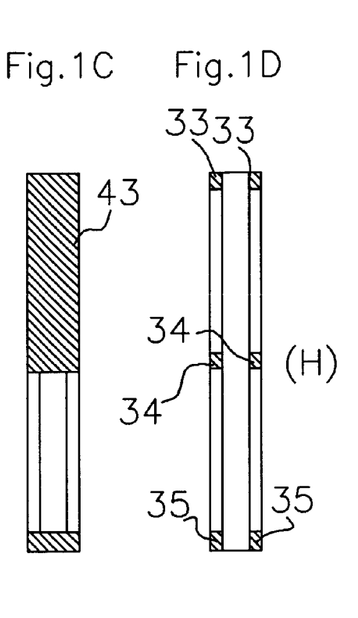
FIG. 1C is a sectional view taken along the line A—A of FIG. 1A.
FIG. 1D is a sectional view taken along the line B—B of FIG. 1A.
Figure 1E:
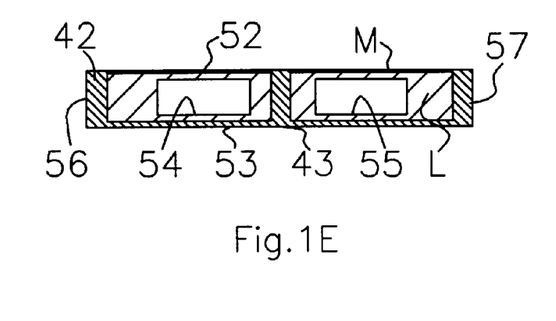
FIG. 1E is a sectional view taken along the line C—C of FIG. 1A.
Figure 2:
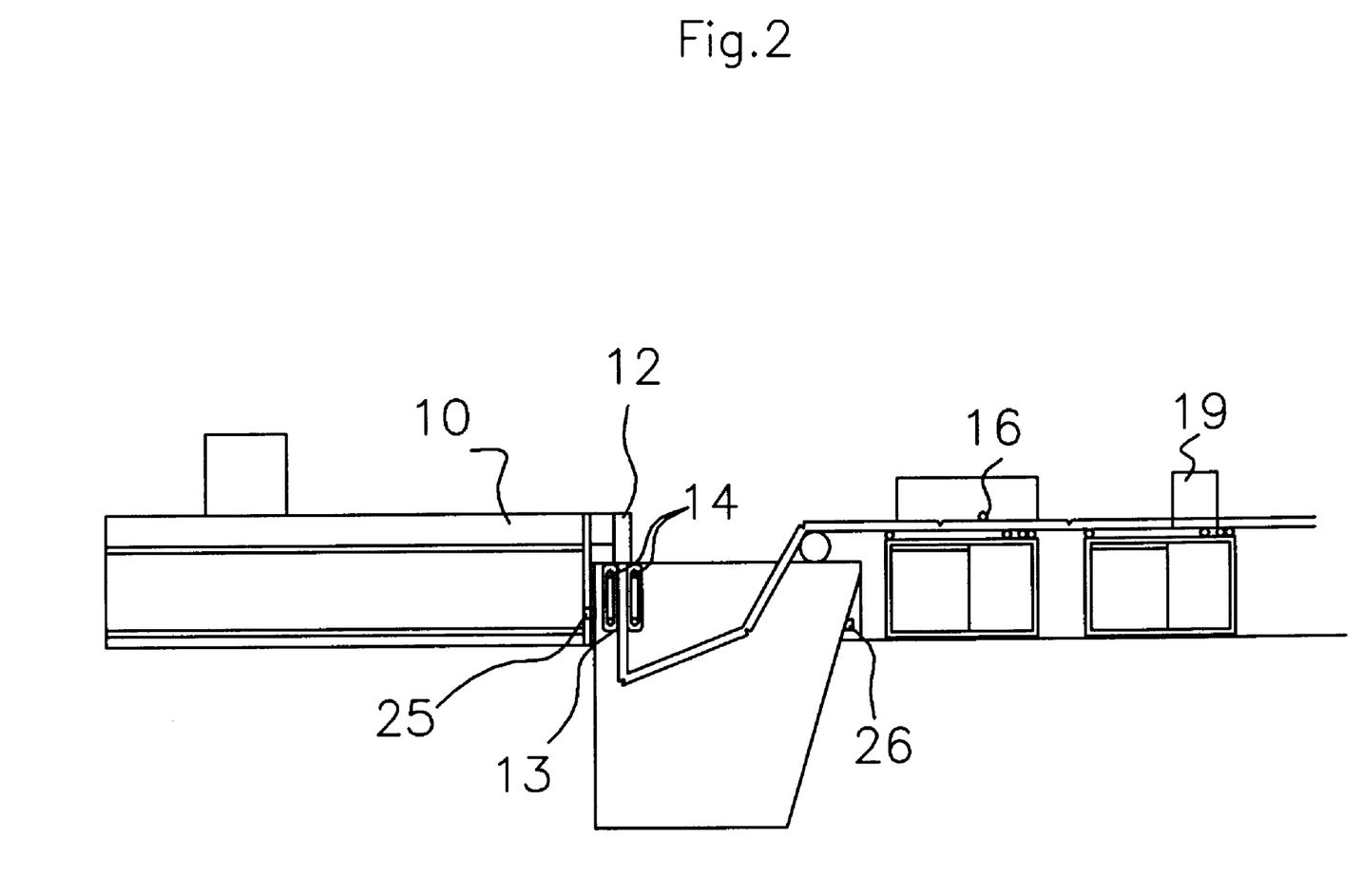
FIG. 2 is a diagram schematically showing the whole arrangement of a pallet-manufacturing apparatus according to the present invention.

During the take-off, for a predetermined time period, the take-off speed is made higher than when the low density portions L in the direction of the length of the fork insertion holes 23 is formed, in a manner corresponding to the length of the single unit of the pallet 30 in the direction of the length of the fork insertion holes 23 of each single unit of the pallet 30, whereby a cutting portion F at which respective filament fibers extend approximately linearly is formed. Then, by using a cutting device 19, the resulting form is cut to the length of the single unit of the pallet 30 in a direction of the width of the fork insertion holes 23. Thus, single pallets 30 are continuously produced (FIG. 2).

Figure 3:
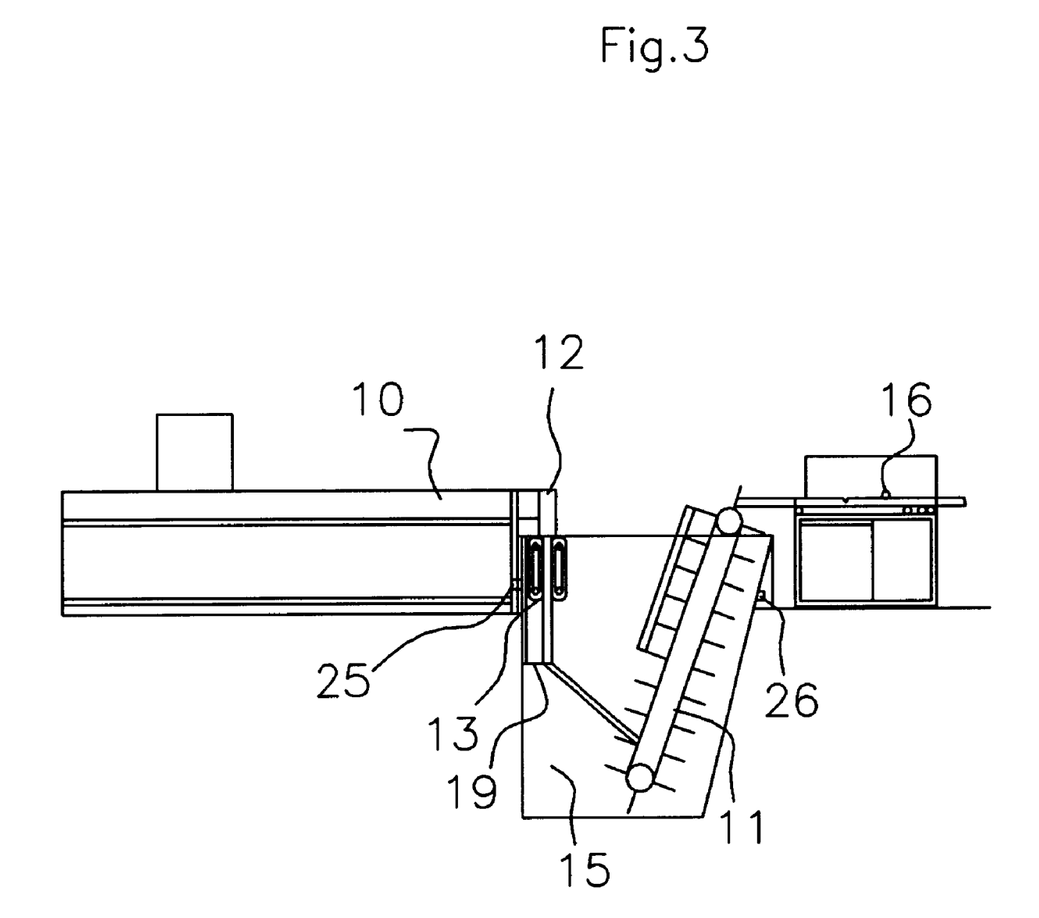
FIG. 3 is a diagram schematically showing the whole arrangement of another pallet-manufacturing apparatus according to the present invention.

FIG. 3 shows a manufacturing apparatus having a bath 15 for cutting the molded form therein. The cutting device 19 is positioned in the vicinity of the winder 13 at a location downward thereof. Arranged on an inner wall side of the bath 15 opposed to the cutting device 19 is a transport device 11 comprised of a conveyer having a lot of engaging projections for insertion into voids of each single pallet cut off at a corresponding cutting portion F. In the figure, reference numerals 25 and 26 designate a water supply valve and a drainage valve, respectively.

The continuous and/or short filaments have a diameter of 0.1 mm to 3.0 mm, preferably, a diameter of 0.3 mm to 0.7 mm.

The continuous and short filaments are preferably made of a thermoplastic elastomer, e.g. an elastomer of polypropylene, polyester, nylon or PVC.

The bulk density of the three-dimensional structure at the low density portion is 0.01 g/cm$^3$ to 0.1 g/cm$^3$, preferably 0.02 g/cm$^3$ to 0.05 g/cm$^3$, while the bulk density at the high density portion is 0.3 g/cm$^3$ to 0.9 g/cm$^3$, preferably 0.5 g/cm$^3$ to 0.7 g/cm$^3$. The bulk density at the flat portion having an intermediate bulk density is 0.1 g/cm$^3$ to 0.9 g/cm$^3$, preferably 0.3 g/cm$^3$ to 0.7 g/cm$^3$.

The void ratio of the three-dimensional structure at the low density portion is 88% to 99%, preferably 94% to 98%, and particularly preferably 94% to 96%, while the void ratio at the high density portion is 0% to 66%, preferably 22% to 44%, and particularly preferably 20% to 30%. The void ratio at the flat portion has an intermediate value with respect to the values of the void ratio at the low density portion and the high density portion.

void ratio=[1−(bulk density)/(specific gravity of resin)]×100

Referring to FIG. 2, the method of producing the resin pallet 30 having a spring structure, according to the present invention, will be described. A resin material, for instance, an elastomer of polypropylene is put into an extruder 10 via a hopper thereof, melted and kneaded therein. Then, the material is extruded through a lot of injection ports formed in the molding die 12 and having a predetermined diameter, and taken off by the winder 13 which sets the thickness and bulk density of the extruded material between feed rollers 14 and 14 thereof, while being randomly curled or looped. The taken-off material is solidified in the water in the bath 15, and taken up by take-up rollers 16 and 16, followed by being cut off at the cutting position F described above, to provide the resin pallet 30 having a spring structure.

Figure 4A:
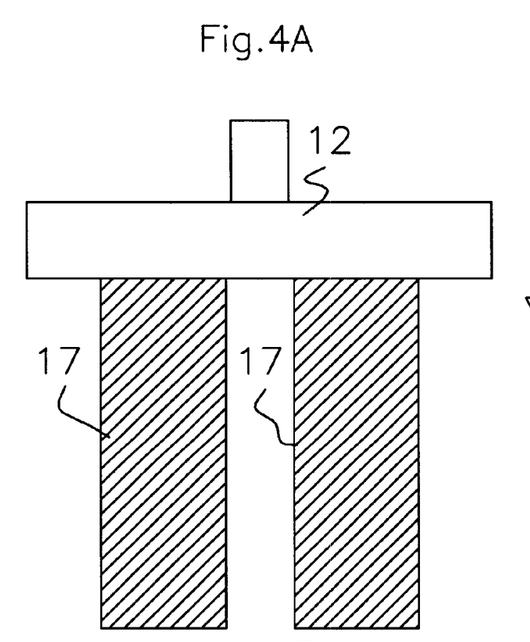
FIG. 4A is a front elevation of the molding die.
Figure 4B:
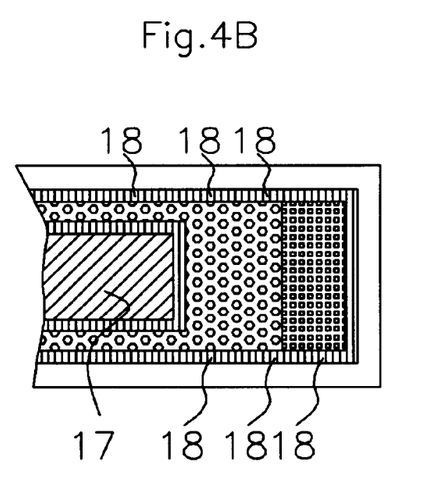
FIG. 4B is an enlarged partial view of an injection port.
Figure 4C:
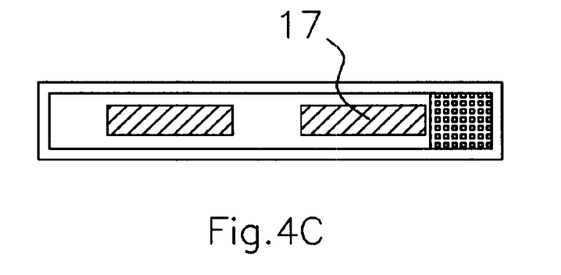
FIG. 4C is a schematic partial bottom view of the molding die.
Figure 5A:
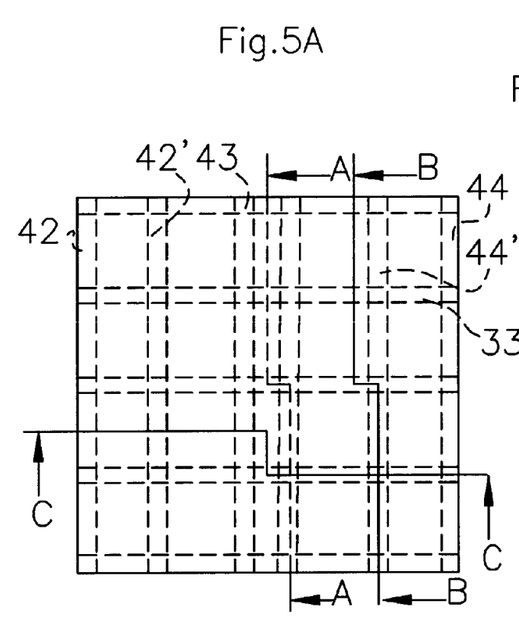
FIG. 5A is a plan view of the second embodiment.
Figure 5B:
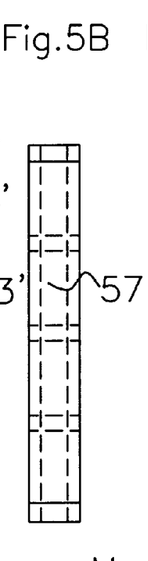
FIG. 5B is a side view of the second embodiment.
Figure 5C:
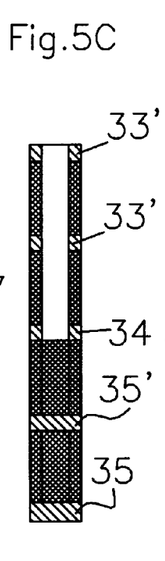
FIG. 5C is a sectional view taken along the line A—A of FIG. 5A.
Figure 5D:
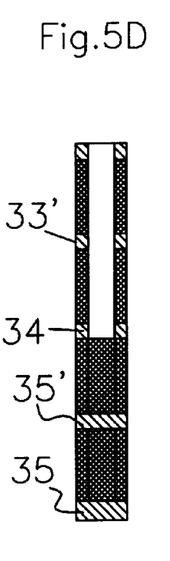
FIG. 5D is a sectional view taken along the line B—B of FIG. 5A.
Figure 5E:
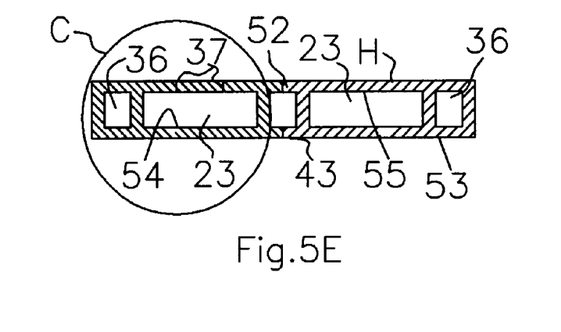
FIG. 5E is a sectional view taken along the line C—C of FIG. 5A.
Figure 5F:
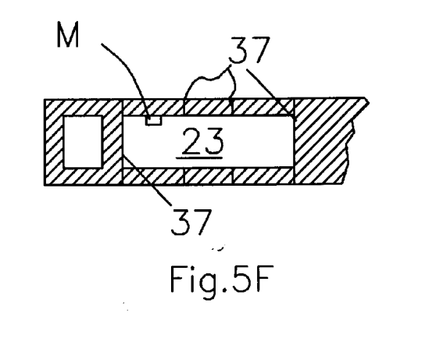
FIG. 5F is an enlarged partial view of a portion C in FIG. 5E.
Figure 6A:
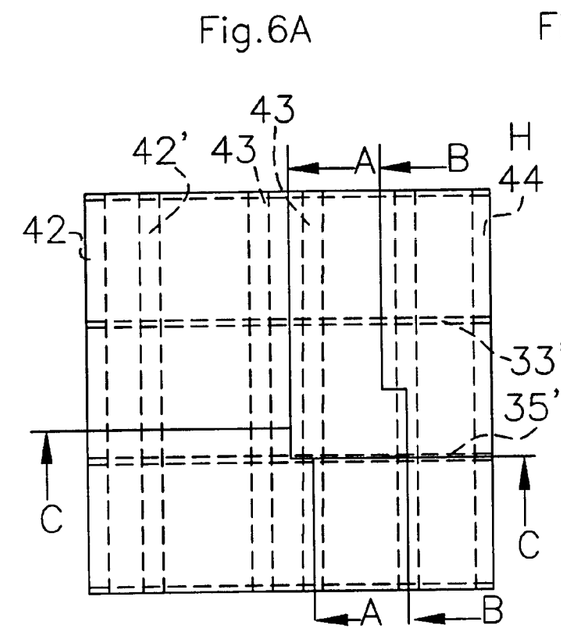
FIG. 6A is a plan view of the third embodiment.
Figures 6B, 6C:
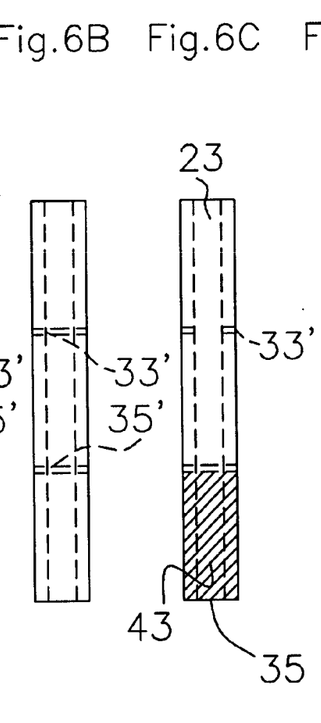
FIG. 6B is a side view of the third embodiment.
FIG. 6C is a sectional view taken along the line A—A of FIG. 6A.
Figure 6D:
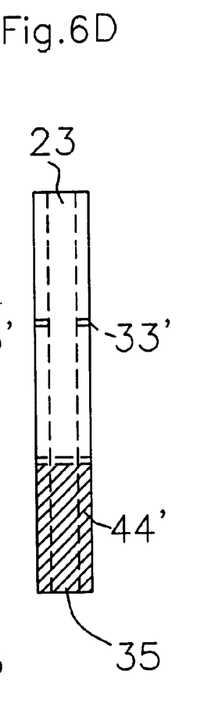
FIG. 6D is a sectional view taken along the line B—B of FIG. 6A.
Figure 6E:
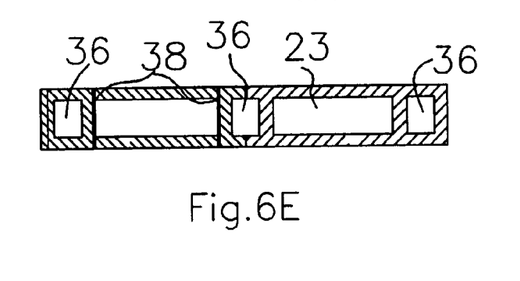
FIG. 6E is a sectional view taken along the line C—C of FIG. 6A.

FIGS. 4A to 4C schematically show the molding die 12. As described hereinabove, each of the cores 17 has a shape of a male mold (to be described later) corresponding to a fork insertion hole, which protrudes in the direction of extrusion of a resin material. The injection ports 18 are defined in diameter, arrangement, and number so as to determine the bulk densities in the direction of extrusion of the pallet, thereby forming the flat portions M, the high density portions H, and the low density portions L constituting essential parts of each single pallet other than the flat portions M and the high density portions H.

Second Embodiment (FIGS. 5A to 5F)

In the second embodiment, there are formed not only the fork insertion holes 23 and 23 but also hollow spaces 36 at locations which divides each single unit of the pallet 30 into approximately three portions in a direction of the width thereof The single unit of the pallet 30 is manufactured by using a molding die having the cores 17 provided in a manner corresponding to the arrangement of the fork insertion holes 23 and 23 and the hollow spaces 36. Therefore, the single unit of the pallet 30 is provided with a two-fold of vertical block portions (42, 42', 43, 44', 44). This is for reducing the weight of the single unit of the pallet 30 and providing a rib structure therefor. Additionally, the single unit of the pallet 30 further includes ribs 37 which are formed with four flat portions M arranged in an area between the inner surfaces of the respective fork insertion holes 23 and 23 opposed to the top and bottom deck boards 52 and 53, and the flat portions M of the top and bottom deck boards 52 and 53.

Further, two lateral block portions 33' and 35' are added at locations equally dividing the single unit of the pallet 30 in the lateral direction.

Single pallet: 1100 mm (width)×1100 mm (length)×150 mm (thickness); 16 kg (weight)

Fork insertion hole: 250 mm (width)×1100 mm (length)×70 mm (thickness)

Third Embodiment (FIGS. 6A to 6E)

The third embodiment shows an example of a molded product which is lower or thinner in height or thickness than the second embodiment. Although the hollow spaces 36 and the vertical block portions are the same as those of the second embodiment, all the lateral block portions including ones arranged on the opposite edge portions of the single unit of the pallet 30 are made thinner and formed as high density portions H at locations dividing the single unit of the pallet 30 into three portions in the length of the single unit of the pallet 30.

Further, differently from the second embodiment, arranged in an area between the inner surfaces 54 and 55 of the respective fork insertion holes 23 and 23 opposed to the top and bottom deck boards 52 and 53, and the flat portions M of the top and bottom deck boards 52 and 53 are two ribs 38 which are formed with high density portions H in a manner vertically extending from the ends of the above inner surfaces 54 and 55 opposite in a direction of the width of the inner surfaces 54 and 55.

Single pallet: 1100 mm (width)×1100 mm (length)×115 mm (thickness); 8 Kg (weight)

Fork insertion hole: 250 mm (width)×1100 mm (length)×60 mm (thickness)

Test

It is determined whether or not the resin pallets according to the embodiments correspond to plastic flat pallets defined by JIS Z0606. The tests are carried out by a flat pallet-testing method in conformity with JIS Z0602. Results of the tests are shown in the following.

Test Example 1 (First Embodiment; FIGS. 1A to 1E)
Maximum load: 1.0 t

TABLE 1

Test example 1 Results of tests concerning strength

| | Items | Results | Reference value of type A |
|---|---|---|---|
| Compressive strength | Distortion (mm) | 3.7 | 4 or less |
| Bending strength | Flexure ratio (%) | 1.3 | 1.5 or less |
| | Residual flexure ratio (%) | 0.4 | 0.5 or less |
| Strength of bottom deck board | Flexure ratio (%) | 2.3 | 2.5 or less |
| Falling strength | Change in diagonal line (%) | 0.8 | 1 or less |

Test Example 2 (Second Embodiment; FIGS. 5A to 5F)
Maximum load: 1.5t

TABLE 2

Table 2 Results of tests concerning strength

| | Items | Results | Reference value of type A |
|---|---|---|---|
| Compressive strength | Distortion (mm) | 3.5 | 4 or less |
| Bending strength | Flexure ratio (%) | 1.0 | 1.5 or less |
| | Residual flexure ratio (%) | 0.3 | 0.5 or less |
| Strength of bottom deck board | Flexure ratio (%) | 2.1 | 2.5 or less |
| Falling strength | Change in diagonal line (%) | 0.7 | 1 or less |

Test Example 3 (Third Embodiment; FIGS. 6A to 6E)
Maximum load: 1.0t

TABLE 3

Table 3 Results of tests concerning strength

| | Items | Results | Reference value of type A |
|---|---|---|---|
| Compressive strength | Distortion (mm) | 3.2 | 4 or less |
| Bending strength | Flexure ratio (%) | 0.8 | 1.5 or less |
| | Residual flexure ratio (%) | 0.4 | 0.5 or less |
| Strength of bottom deck board | Flexure ratio (%) | 2.3 | 2.5 or less |
| Falling strength | Change in diagonal line (%) | 0.6 | 1 or less |

As clearly shown in the tests described above, the resin pallets according to the embodiments correspond to the plastic flat pallet of the A type defined by JIS Z-0606.

Thus the broadest claims that follow are not directed to a machine that is configure in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heat of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustration and not in a limiting sense. It is also to be understood that the following claims are intended to cover all of the generic and specific features of the invention herein described, and all statements of the scope of the invention which, as a matter of language, might be said to fall therebetween.

Now that the invention has been described:

Explanation of Numerals

10: an extruder
11: a transport device
12: a molding die
13: a winder
14: feed rollers
15: a bath
16: take-up rollers
17: cores
18: injection ports
19: a cutting device
F: a cutting portion
L: a low density portion
H: a high density portion
M: a flat portion
23: fork insertion holes
25: a water supply valve
26: a drainage valve
30: a resin pallet having a spring structure
33, 34, 35: (lateral) block portions
36: hollow spaces
37, 38: ribs
42, 43, 44: (vertical) block portions
52, 53: top and bottom deck boards
54, 55: inner surfaces of the fork insertion holes
56, 57: side deck boards

What is claimed is:

1. A pallet comprising:
   a three-dimensional structure with a predetermined bulk density and voids, said three dimensional structure being formed by contacting, entwining, and gathering one of adjacent ones of random loops or curls of continuous filaments, short filaments of a thermoplastic resin and combination thereof,
   wherein a single unit of the pallet is formed with high density portions having an increased bulk density at opposite ends of fork insertion holes of said single unit of the pallet in a direction of length of said fork insertion holes and approximately at a central portion of said single unit of the pallet in said direction, said high density portions extending to said opposite ends of said fork insertion holes in said direction of length of said fork insertion holes and opposite ends of said fork insertion holes in a direction of width thereof, and formed with flat portions having a bulk density not higher than those of said high density portions at least inner surfaces of said fork insertion holes or an outer periphery and said inner surfaces of said fork insertion holes being formed.

2. The resin pallet according to claim 1, wherein said continuous filaments and said short filaments are formed of a thermoplastic elastomer.

3. The resin pallet according to claim 2, wherein said continuous filaments and said short filaments have a diameter of 0.1 mm to 3.0 mm.

4. The resin pallet according to claim 3, wherein said continuous filaments and said short filaments forming said low density portions have a diameter of 0.1 mm to 3.0 mm, said structure of said three-dimensional structure having a bulk density of 0.01 g/cm3 to 0.1 g/cm3.

5. The resin pallet according to claim 3, wherein said continuous filaments and said short filaments forming said low density portions have a diameter of 0.7 mm to 1.5 mm, said structure of said three-dimensional structure having a bulk density of 0.02 g/cm3 to 0.05 g/cm3.

6. The resin pallet according to claim 2, wherein said continuous filaments and said short filaments have a diameter of 0.3 mm to 0.7 mm.

7. The resin pallet according to claim 2, wherein said continuous filaments and said short filaments are formed of a thermoplastic elastomer.

8. The resin pallet according to claim 7, wherein said continuous filaments and said short filaments have a diameter of 0.1 mm to 3.0 mm.

9. The resin pallet according to claim 7, wherein said continuous filaments and said short filaments have a diameter of 0.3 mm to 0.7 mm.

10. The resin pallet according to claim 1, wherein said continuous filaments and said short filaments have a diameter of 0.1 mm to 3.0 mm.

11. The resin pallet according to claim 1, wherein a structure of said three-dimensional structure has a bulk density of 0.1 g/cm3 to 0.9 g/cm3.

12. The resin pallet according to claim 1, wherein portions other than said high density portions and said flat portions are formed as low density portions having a bulk density not higher than that of said flat portions.

13. The resin pallet according to claim 1, wherein an outer peripheral surface of the pallet including said inner surfaces of said fork insertion holes or said outer periphery of said fork insertion holes is formed with flat portions having a bulk density not higher than that of said high density portions.

14. The resin pallet according to claim 1, wherein said continuous filaments and said short filaments have a diameter of 0.3 mm to 0.7 mm.

15. The method of producing a resin pallet having a spring structure, by melt-extruding a thermoplastic resin and/or a thermoplastic elastomer into a plurality of filaments, and contacting, entwining and gathering adjacent ones of random loops or curls of continuous filaments, thereby forming said filaments into a pallet having a three-dimensional structure with a predetermined bulk density and voids, the method comprising the steps of:

forming high density portions and flat portions, or said high density portions and said flat portions as well as low density portions in a direction of width of said fork insertion holes by changing a take-off speed for taking off the fusion-extruded continuous filaments; and extrusion-molding said fork insertion holes by using cores; extruding, taking off, and forming high density portions and flat portions, or said high density portions and said flat portions as well as low density portions in a direction of length of said fork insertion holes, by changing a density of injection ports, on a portion-by-portion basis.

16. The method of producing a resin pallet having a spring structure according to claim 15, wherein when fusion-extruded material is taken off, in said direction of length of said fork insertion holes, said take-off speed is made faster in a manner corresponding to said length of a single unit of pallet pallet than when said low density portions are formed, and cutting said fusion-extruded material in a direction of width of said fork insertion holes to said length of each said single unit of the pallet.

* * * * *